(12) United States Patent
Steele

(10) Patent No.: US 7,500,394 B2
(45) Date of Patent: Mar. 10, 2009

(54) FASTENER INTEGRATED SENSOR

(75) Inventor: Ryan N. Steele, Dearborn, MI (US)

(73) Assignee: TK Holdings Inc., Auburn Hills, MI (US)

( * ) Notice: Subject to any disclaimer, the term of this patent is extended or adjusted under 35 U.S.C. 154(b) by 351 days.

(21) Appl. No.: 11/206,899

(22) Filed: Aug. 19, 2005

(65) Prior Publication Data

US 2007/0040663 A1  Feb. 22, 2007

(51) Int. Cl.
*G01P 1/02* (2006.01)
*G01P 15/08* (2006.01)

(52) U.S. Cl. .......................... 73/493; 73/966.5; 73/654
(58) Field of Classification Search .................. 73/493, 73/866.5, 431, 654
See application file for complete search history.

(56) References Cited

U.S. PATENT DOCUMENTS

| | | | |
|---|---|---|---|
| 4,347,743 A * | 9/1982 | Rausche et al. ............... | 73/654 |
| 4,947,690 A * | 8/1990 | Cleveland ..................... | 73/654 |
| 5,745,347 A | 4/1998 | Miller et al. | |
| 5,847,278 A * | 12/1998 | Judd ........................... | 73/493 |
| 5,996,408 A * | 12/1999 | TenBrink et al. ............... | 73/493 |
| 6,172,313 B1 | 1/2001 | Sakamoto et al. | |
| 6,711,951 B2 * | 3/2004 | Kicher et al. ................. | 73/493 |
| 7,134,334 B2 * | 11/2006 | Schirmer et al. .............. | 73/493 |

FOREIGN PATENT DOCUMENTS

| | | |
|---|---|---|
| DE | 198 57 516 A1 | 6/1999 |
| DE | 198 03 359 A1 | 8/1999 |
| JP | 2001 356133 A | 12/2001 |
| JP | 2002 022760 A | 1/2002 |

* cited by examiner

*Primary Examiner*—Helen C. Kwok
(74) *Attorney, Agent, or Firm*—Foley & Lardner LLP

(57) ABSTRACT

A fastener integrated sensor includes a fastener, an overmold, an electronic sensor, a printed circuit board, a plurality of circuit components, a plurality of signal terminals, and a connector shroud. The fastener integrated sensor mounts rigidly to the vehicle body to capture and provide structural information during a crash event.

17 Claims, 5 Drawing Sheets

FASTENER INTEGRATED SENSOR

BACKGROUND

The present invention is generally related to occupant protection systems in automobiles. More specifically, the present invention is related to a crash detection system.

Restraint systems such as inflatable airbags have become standard equipment in modern automobiles. Airbag devices, such as driver seat airbags and passenger seat airbags are widely used to protect passengers from the impact produced during a vehicle collision. A driver seat air bag is typically mounted on a boss of a steering wheel and includes a gas injecting inflator, an air bag, and a cover accommodating the air bag in a folded state. During a collision, the gas injected from the inflator inflates the airbag.

Generally, airbag deployment is controlled by the controller of a crash detection system. The controller determines whether to deploy an airbag based on a collection of information from various sensors throughout the vehicle. In some instances, the controller itself is also a sensor for obtaining vehicle information. The sensors used to collect the crash information may vary in size, shape and their location. For example, conventional crash sensors are typically encased in a plastic housing and are bolted to a vehicle frame. Generally, the controller is housed in a metal casing.

Mounting these crash sensors typically requires a fastening mechanism separate from that of the sensor itself. In turn, both assembly and manufacturing costs are increased because the manufacturer is burdened with multiple components. In addition, there are more installation steps and thus more time is needed to install the conventional crash sensors. Further, placement of a conventional sensor is more difficult because of the unit's size. Accordingly, because of increasing safety demands and the increasing costs of crash sensor technology, there is a need for a more compact and easily mountable crash sensor.

SUMMARY

The present invention relates to a fastener integrated sensor including a fastener, having a head portion and a body portion, wherein the body portion is configured to mount to the body of a vehicle, an electronic sensor, positioned at the head portion of the fastener and configured to monitor conditions related to crash detection and an overmold, configured to encapsulate the electronic sensor and the head portion of the fastener.

In one embodiment of the invention, the fastener is composed of metal. In another embodiment of the invention, the fastener is composed of polymer. The polymer has structural properties such that the material retains the fastening load acceptably over the life of the material.

According to yet another embodiment of the invention, the polymer overmold is comprised of one-piece molded polymer. In still another embodiment of the invention, the polymer overmold is comprised of a two-piece molded polymer. The two polymer pieces are operably connected and encapsulate the printed circuit board. The two polymer pieces may be glued, welded, snap-fit, or mechanically fastened, and may use additional sealing technologies such as potting or silicon sealant.

In yet another embodiment of the invention, the electronic sensor may be a decelerometer, an accelerometer, a crush zone sensor, a gyroscope, or a pressure sensor.

According to still another embodiment of the invention, the present invention relates to a crash detection system such that the fastener integrated sensor collects data and transmits the data to a controller, wherein the controller receives data from the electronic sensor and uses this data to determine whether to deploy a vehicle's occupant restraint devices.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

Figure 1:
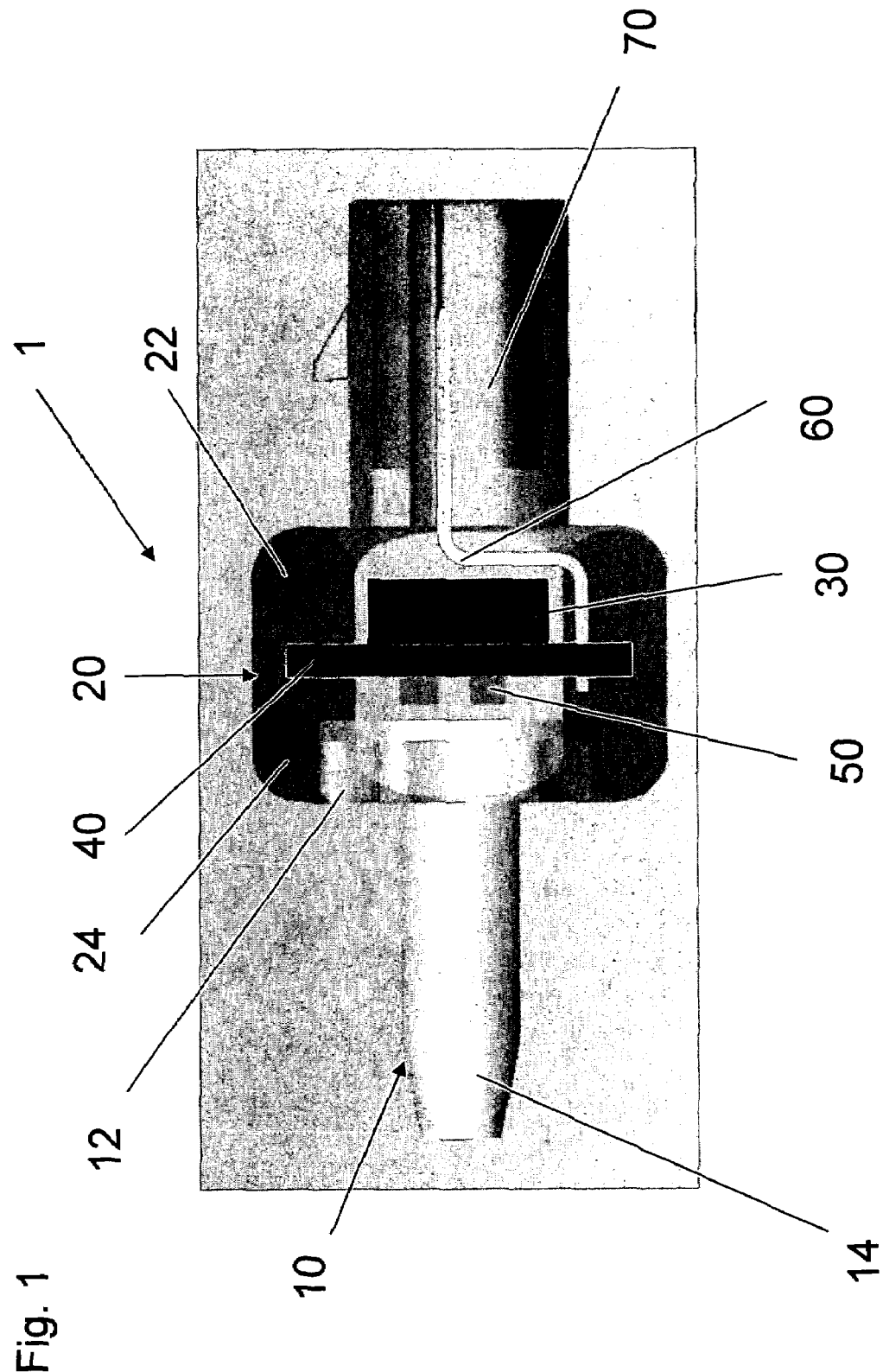
FIG. 1 is a cross-sectional view of a fastener integrated sensor according to one embodiment of the present invention.

As shown in FIG. 1, a fastener integrated sensor 1, according to one embodiment of the invention, includes a fastener 10, an overmold 20, an electronic sensor 30, a printed circuit board 40, a plurality of circuit components 50, a plurality of signal terminals 60, and a connector shroud 70.

The fastener 10 includes two parts: the fastener head 12 and a fastener body 14, which may be threaded. According to one embodiment of the present invention, the fastener 10 is made of metal. According to another embodiment of the present invention, the fastener 10 is made of a polymer compound. The polymer has structural properties such that the material retains the fastening load acceptably over the life of the material.

The fastener 10 attaches the fastener integrated sensor 1 to a vehicle body. Mounting locations are chosen to maximize the detection of a crash event. Thus, the fastener 10 is rigidly attached to the vehicle body and is made of sufficiently strong material so as not to deform during a dynamic crash event.

Typically, fastener integrated sensors 1 are placed in the front and on each side of a vehicle. Normally, one to two sensors are placed toward the front of a vehicle. Possible front locations include the radiator support and the bumper. Typically, a vehicle has at least 1-2 sensors on each side. Possible side locations include the pillar between the doors and in the doors.

The fastener 10 is held in position by the overmold 20. The fastener head 12 is encapsulated in the overmold 20 such that the underside of the fastener head 12 and the body of the fastener 14 are the only portions of the fastener 10 that remain visible. According to one embodiment of the invention, the overmold 20 is formed from a polymer compound.

The overmold 20, described above as encapsulating the fastener head 12, may be in the shape of a common fastener head. According to one embodiment of the invention, the shape may be square, hexagonal, or any other conventional shape.

According to one embodiment of the present invention, the overmold 20, comprises a one-piece molded overmold 20. According to another embodiment of the present invention, the overmold 20 comprises a two-piece molded polymer overmold. The first polymer overmold piece encapsulates the fastener head 12 such that the underside of the fastener head 12 and the body of the fastener 14 are the only portions of the fastener 10 that remain visible. The first polymer overmold piece is half of the common fastener head portion 22 of FIG. 1. The second polymer overmold piece includes the other half of the common fastener head portion 24 and the connector shroud 70. The first and second polymer overmold pieces are operably connected and encapsulate the printed circuit board 40. The first and second polymer overmold pieces can be glued, welded, snap-fit, or mechanically fastened, and may use additional sealing technologies such as potting or silicon.

The advantages of the overmold 20 being in the shape of a common fastener head include ease of assembly and attachment to the vehicle body. Moreover, the overmold 20 provides a structural function that transfers torque from the outside of the overmold 20 to the metallic fastener 10.

The overmold 20 also provides a protective function by sealing electronics from outside environments. The protected electronics may include the electronic sensor 30, the printed circuit board 40, a plurality of circuit components 50, and a plurality of signal terminals 60.

The electronic sensor 30 is operably connected to the printed circuit board 40 and is one of the components protected by the overmold 20. The data obtained by the electronic sensor 30 may be used to detect changes in the physical properties of a vehicle. For example, a crash detection system may use the electronic sensor 30 data to determine whether a crash is severe enough to deploy a vehicle's restraint systems.

In another embodiment of the invention, the electronic sensor 30 is an accelerometer (or a decelerometer). An accelerometer measures the acceleration and/or the deceleration of a vehicle. Based on data captured by the accelerometer, a crash detection system may determine whether to deploy the vehicle's crash restraint devices.

According to yet another embodiment of the invention, the electronic sensor 30 is a crush zone sensor. A crush zone sensor measures the amount a vehicle has been crushed or deformed through contact with other objects during a dynamic crash event. Based on data captured by the crush zone sensor, a crash detection system may determine whether to deploy the vehicle's crash restraint devices.

In still another embodiment of the invention, the electronic sensor 30 is a gyroscope. A gyroscope measures the rotation of the vehicle relative to the rotation of the fastener integrated sensor 1. Based on data captured by the gyroscope, a crash detection system may determine whether to deploy the vehicle's crash restraint devices.

In yet another embodiment of the invention, the electronic sensor 30 is a pressure sensor. A pressure sensor measures the pressure on the vehicle at the point of impact relative to the normal pressure on the vehicle at the faster integrated sensor. Based on data captured by the pressure sensor, a crash detection system may determine whether to deploy the vehicle's crash restraint devices.

According to still another embodiment of the invention, the electronic sensor 30 may be a combination of the sensors described above.

The electronic sensor 30 is operably connected to the first surface of the printed circuit board 42. The printed circuit board 40 has a first surface 42 and a second surface 44. The printed circuit board 40 is comprised of any known conventional material suitable for receiving an electronic circuit.

A plurality of circuit components 50 are operably connected to the second surface 44 of the printed circuit board 40. The plurality of circuit components 50 may include a memory and a processor (not shown). Data may be delivered from the sensor 30 to the memory and processing units.

Figure 2:
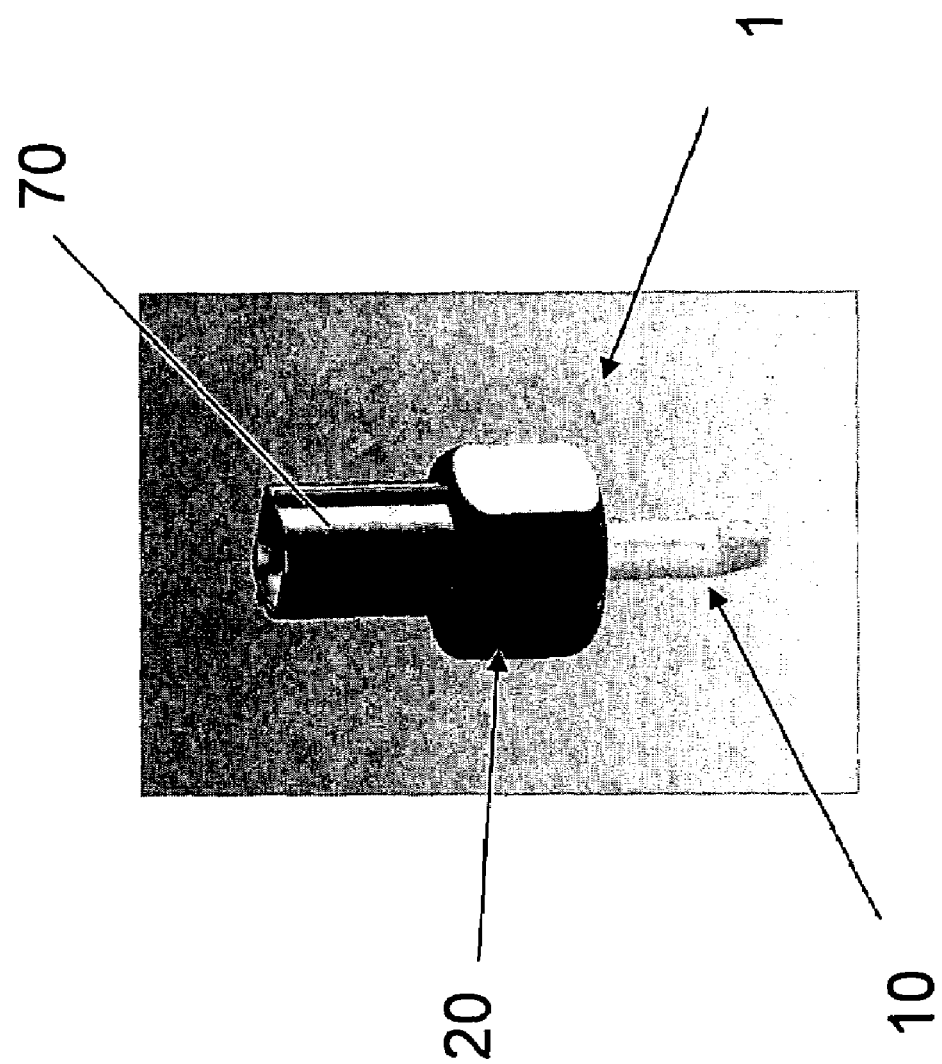
FIG. 2 is a side view of a fastener integrated sensor according to one embodiment of the present invention.
Figure 3:
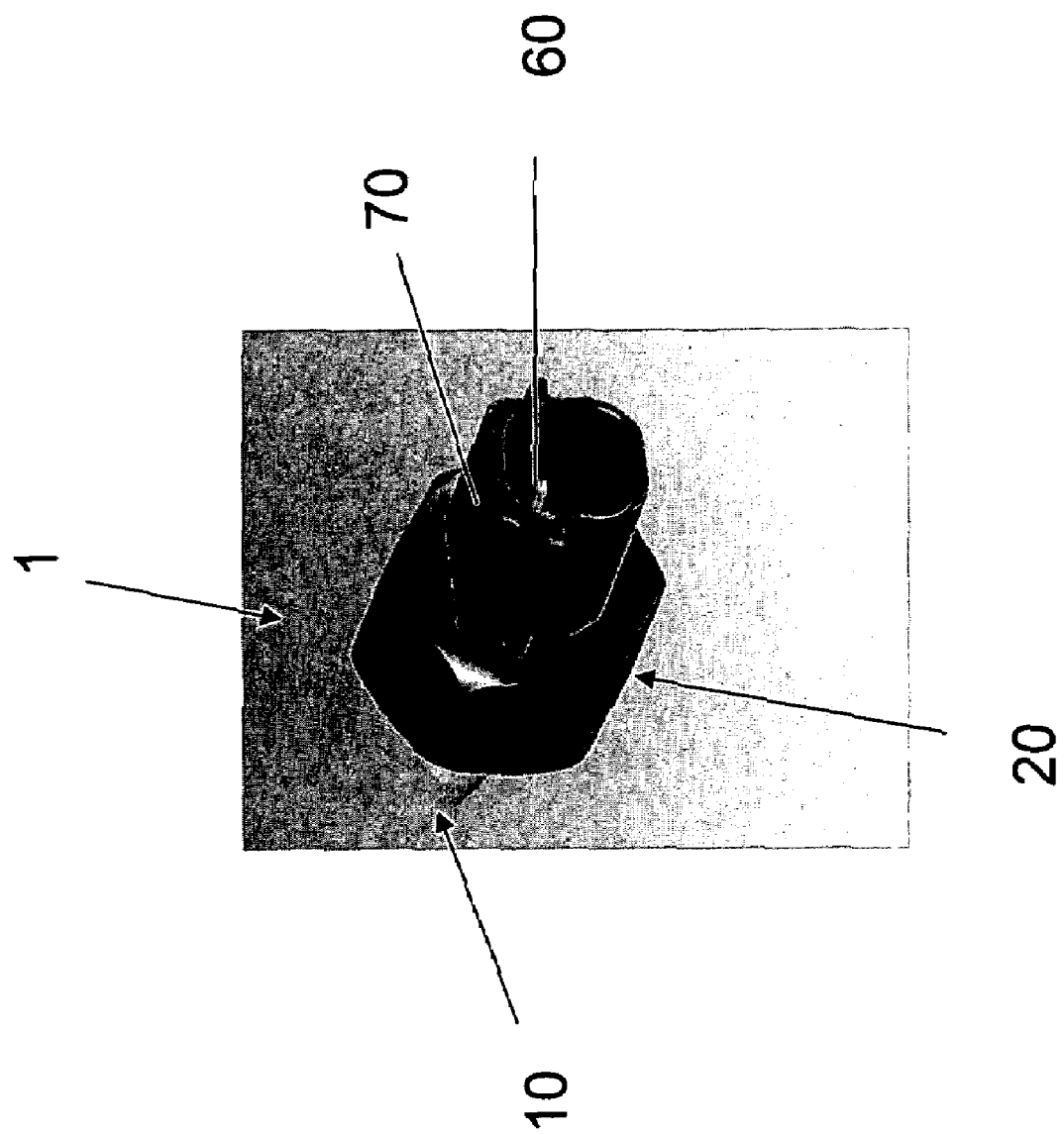
FIG. 3 is a perspective view of a fastener integrated sensor according to one embodiment of the present invention.
Figure 4:
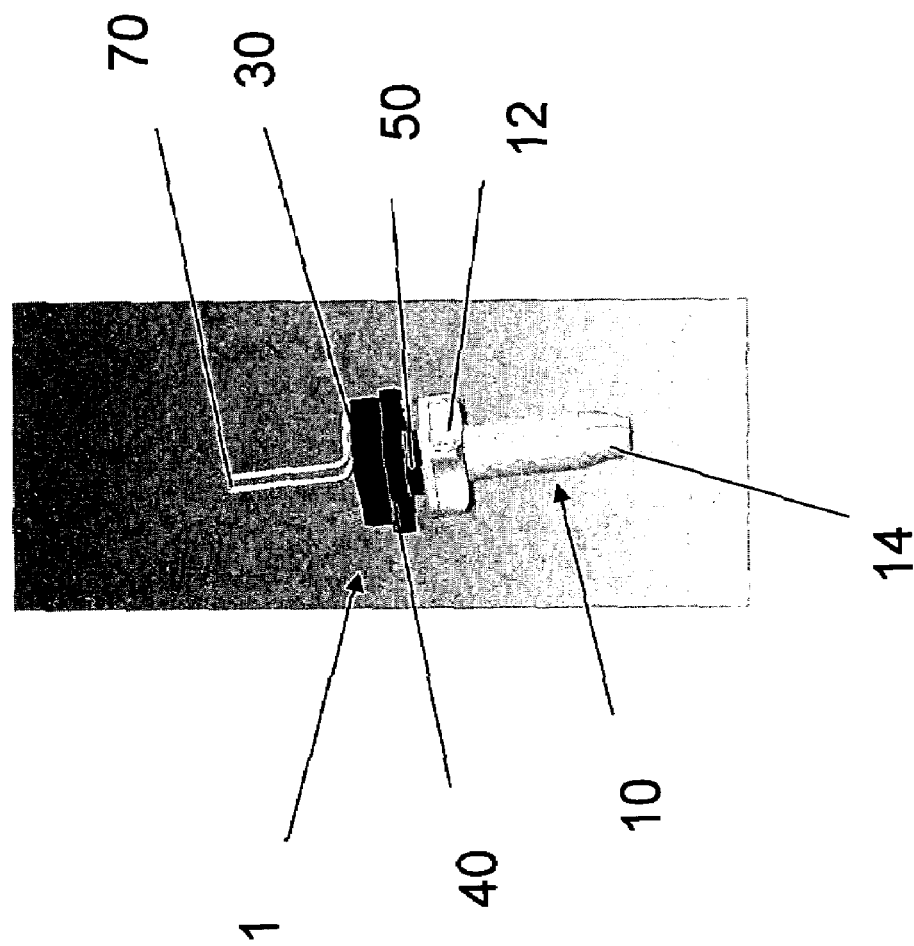
FIG. 4 is a side view of a fastener integrated sensor according to one embodiment of the present invention.
Figure 5:
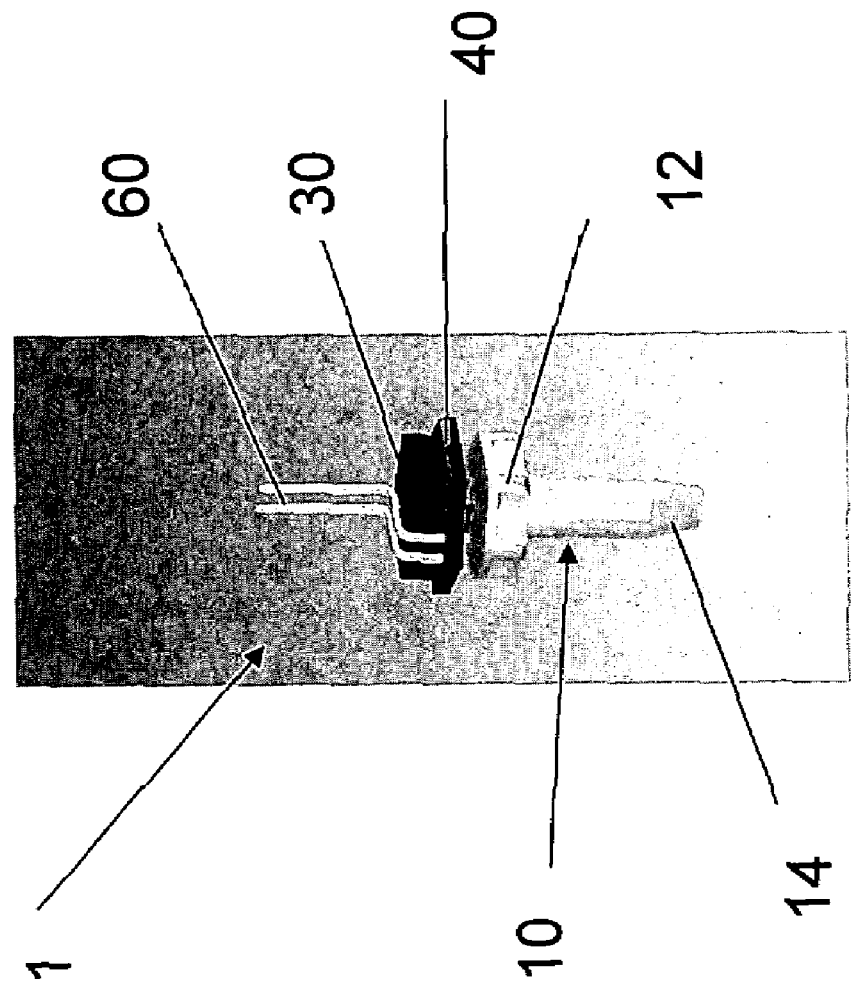
FIG. 5 is a side view of a fastener integrated sensor according to one embodiment of the invention.

As shown in FIG. 1, a plurality of signal terminals 60 are operably connected to the printed circuit board 40. As shown in FIGS. 2 and 4, the plurality of signal terminals 60 are enclosed in a connector shroud 70. The connector shroud 70 protects the plurality of signal terminals 60 from outside environments.

The signal terminals 60 may be operably connected to a crash detection system. Specifically, the signal terminals 60 may be operably connected to the controller of a crash detection system. According to one embodiment of the invention, a driver protection system using the fastener integrated sensor 1 operates as follows. The fastener integrated sensor 1 detects, processes, and sends a signal to the controller of a crash detection system. The controller then determines whether the conditions detected by the sensor 30 warrant actuation of the vehicle's crash restraint system.

There are many advantages to the fastener integrated sensor 1 of the present invention. By combining both the fastener 10 and the sensor 30 into one device, the total number of system parts and the associated costs are both reduced. At the vehicle assembly stage, customer costs are reduced due to fewer parts, less installation steps, and less time needed to install. Finally, the fastener integrated sensor 1 of the present invention is small and compact.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A fastener integrated sensor comprising:
   a fastener, having a head portion and a body portion, wherein the body portion is configured to mount to a body of a vehicle;
   an electronic sensor, positioned at the head portion of the fastener and configured to monitor conditions related to crash detection; and
   an overmold, configured to encapsulate the electronic sensor and the head portion of the fastener.

2. The fastener integrated sensor of claim 1, further comprising:
   a printed circuit board, encapsulated by the overmold, having a first surface and a second surface, wherein the electronic sensor is operably connected to the first surface of the printed circuit board;
   a plurality of circuit components operably connected to the second surface of the printed circuit board;
   a plurality of signal terminals operably connected to the printed circuit board; and
   a connector shroud, surrounding one end of the plurality of signal terminals.

3. The fastener integrated sensor of claim 1, wherein the fastener is comprised of metal.

4. The fastener integrated sensor of claim 1, wherein the fastener is comprised of polymer with structural properties such that a polymer material retains the polymer material's original elastic modulus over a life of the material.

5. The fastener integrated sensor of claim 1, wherein the overmold is comprised of a one-piece molded polymer compound encapsulating a fastener head such that an underside of the fastener head and the body portion of the fastener are the only portions of the fastener that are not enclosed by the overmold.

6. The fastener integrated sensor of claim 1, wherein the overmold is comprised of a two-piece molded polymer compound.

7. The fastener integrated sensor of claim 1, wherein the overmold is shaped to transfer torque to the fastener.

8. The fastener integrated sensor of claim 1, wherein the electronic sensor is a decelerometer and measures a deceleration of the vehicle.

9. The fastener integrated sensor of claim 1, wherein the electronic sensor is an accelerometer and measures an acceleration of the vehicle.

10. The fastener integrated sensor of claim 1, wherein the electronic sensor is a crush zone sensor and measures a vehicle's deformation.

11. The fastener integrated sensor of claim 1, wherein the electronic sensor is a gyroscope and measures a rotation of the vehicle relative to a rotation of the fastener integrated sensor.

12. The fastener integrated sensor of claim 1, wherein the electronic sensor is a pressure sensor and measures a pressure on the vehicle at a point of impact relative to a pressure on the vehicle at the fastener integrated sensor.

13. The fastener integrated sensor of claim 1, wherein the electronic sensor is configured to detect deceleration, acceleration, physical deformation, rotation and pressure.

14. The fastener integrated sensor of claim 2, wherein the plurality of circuit components is comprised of a processor and a memory unit.

15. A fastener integrated sensor comprising:
a fastener, having a head portion and a body portion, wherein the body portion is configured to mount the fastener integrated sensor to a body of a vehicle;
an electronic sensor, positioned at the head portion of the fastener and configured to monitor conditions related to crash detection;
a plurality of signal terminals operably connected to the electronic sensor and configured to transmit signals generated by the electronic sensor; and
an overmold, configured to encapsulate electronic sensor, the plurality of signal terminals and the head portion of the fastener.

16. A fastener integrated sensor comprising:
a fastener, having a head portion and a body portion, wherein the body portion is configured to mount the fastener integrated sensor to a body of a vehicle;
an electronic sensor, positioned at the head portion of the fastener and configured to monitor conditions related to crash detection;
an overmold, configured to encapsulate electronic sensor and the head portion of the fastener;
a printed circuit board, encapsulated by the overmold, having a first surface and a second surface, wherein the electronic sensor is operably connected to the first surface of the printed circuit board;
a plurality of circuit components operably connected to the second surface of the printed circuit board;
a plurality of signal terminals operably connected to the printed circuit board; and
a connector shroud, surrounding one end of the signal terminals.

17. A crash detection system for controlling a vehicle's occupant restraint devices, comprising:
a fastener, having a head portion and a body portion, wherein the body portion is configured to mount to a body of a vehicle;
an electronic sensor, positioned at the head portion of the fastener and configured to monitor conditions related to crash detection;
a plurality of signal terminals operably connected to the electronic sensor and configured to transmit signals generated by the electronic sensor;
an overmold, configured to encapsulate the electronic sensor, the plurality of signal terminals and the head portion of the fastener; and
a controller operably connected to the plurality of signal terminals, wherein the controller receives data from the electronic sensor and uses this data to determine whether to deploy a vehicle's occupant restraint devices.

* * * * *